United States Patent
Tu et al.

(10) Patent No.: US 11,460,311 B2
(45) Date of Patent: Oct. 4, 2022

(54) PATH PLANNING METHOD, SYSTEM AND DEVICE FOR AUTONOMOUS DRIVING

(71) Applicant: GUANGZHOU XIAOPENG MOTORS TECHNOLOGY CO., LTD., Guangzhou (CN)

(72) Inventors: Qiang Tu, Guangzhou (CN); Jianming Lai, Guangzhou (CN); Peng Li, Guangzhou (CN); Shengjun Chen, Guangzhou (CN); Zhiguang Xiao, Guangzhou (CN)

(73) Assignee: GUANGZHOU XIAOPENG MOTORS TECHNOLOGY CO., LTD., Guangzhou (CN)

( * ) Notice: Subject to any disclaimer, the term of this patent is extended or adjusted under 35 U.S.C. 154(b) by 430 days.

(21) Appl. No.: 16/732,231

(22) Filed: Dec. 31, 2019

(65) Prior Publication Data
US 2020/0149906 A1    May 14, 2020

Related U.S. Application Data

(63) Continuation of application No. PCT/CN2018/102811, filed on Aug. 29, 2018.

(30) Foreign Application Priority Data

Aug. 29, 2018   (CN) .......................... 201710770252.6

(51) Int. Cl.
*G01C 21/34*        (2006.01)
*B60W 60/00*       (2020.01)
(Continued)

(52) U.S. Cl.
CPC ..... *G01C 21/3446* (2013.01); *B60W 60/0011* (2020.02); *G05D 1/0217* (2013.01);
(Continued)

(58) Field of Classification Search
CPC ............... G01C 21/3446; G01C 21/20; B60W 60/0011; B60W 2552/30; B60W 2520/00;
(Continued)

(56) References Cited

U.S. PATENT DOCUMENTS

2017/0124476 A1*   5/2017   Levinson ............... G06V 20/58
2017/0277192 A1*   9/2017   Gupta .................... B60W 30/20
(Continued)

FOREIGN PATENT DOCUMENTS

| CN | 102591332 A | 7/2012 |
| CN | 106598055 A | 4/2017 |

(Continued)

OTHER PUBLICATIONS

Fang, Yan-Jun et al, "Study of the Path Planning of Unmanned Vehicles Based on the Multi-curvature Fitting-model" Automation & Instrumentation, No. 3, (Mar. 2012), pp. 1-5, English Abstract is included.

(Continued)

*Primary Examiner* — Abby Y Lin
*Assistant Examiner* — Renee LaRose
(74) *Attorney, Agent, or Firm* — J.C. Patents

(57) ABSTRACT

A path planning method, system, and device for autonomous driving are provided, where the method includes: acquiring environment perception information and vehicle positioning and navigation information, where the environment perception information includes obstacle information, roadside information, and lane line information, and the vehicle positioning and navigation information includes a vehicle pose and a target route; generating sub-paths according to the environment perception information and the vehicle positioning and navigation information, to obtain candidate sub-paths meeting vehicle constraints; performing a collision detection on the candidate sub-paths meeting the (Continued)

vehicle constraints, to obtain collision-free candidate sub-paths; performing a sub-path search on the collision-free candidate sub-paths by using an A* search algorithm; and obtaining, according to a result of the sub-path search, a local path of a vehicle.

14 Claims, 9 Drawing Sheets

(51) Int. Cl.
    *G05D 1/02*         (2020.01)
    *G06V 20/58*      (2022.01)

(52) U.S. Cl.
    CPC ......... *G05D 1/0238* (2013.01); *G05D 1/0289* (2013.01); *G06V 20/58* (2022.01); *B60W 2552/30* (2020.02)

(58) Field of Classification Search
    CPC ......... B60W 2552/53; B60W 2554/40; B60W 2556/50; G05D 1/0217; G05D 1/0238; G05D 1/0289; G06V 20/58; G06V 20/56; B62D 15/025
    See application file for complete search history.

(56) References Cited

U.S. PATENT DOCUMENTS

2017/0277716 A1*   9/2017   Giurgiu ................... G06F 16/23
2019/0086226 A1*   3/2019   Hamada ............. G01C 21/3658

FOREIGN PATENT DOCUMENTS

CN           107702716 A     2/2018
KR        2015-0084143 A     7/2015

OTHER PUBLICATIONS

Jiang, Yan et al, "System Design of Self-driving in Simplified Urban Environments" Journal of Mechanical Engineering, No. 48, vol. 20, (Oct. 2012), pp. 103-112, English Abstract is included.

Zhang, Xuefei et al, "A Method of Local Path Planning and Trajectory Generation for ALV" Proceedings of SAE-China Congress 2007, (Aug. 2007), pp. 1225-1228, English Abstract is included.

Zhou, Liang, "The Research on Mobile Robot Path Planning in Irregular Obstacle Environment" Hunan University Information Science & Technology Master Thesis Paper, (Apr. 2011), English Abstract is included at p. III-IV.

The International Search Report of corresponding International application No. PCT/CN2018/102811, dated Dec. 6, 2018.

* cited by examiner

PATH PLANNING METHOD, SYSTEM AND DEVICE FOR AUTONOMOUS DRIVING

CROSS REFERENCES OF RELATED APPLICATIONS

The present application is a continuation of International Application No. PCT/CN2018/102811 filed on Aug. 29, 2018, which claims the priority of the Chinese patent application No. CN201710770252.6 filed on Aug. 31, 2017. The contents of the above identified applications are incorporated herein by reference in their entireties.

TECHNICAL FIELD

The present application relates to the field of automatic driving, and in particular, to a path planning method, system and device for autonomous driving.

BACKGROUND

Vehicle automatic driving technology (also known as vehicle autonomous driving technology) has great potential in travel safety, energy saving and environment protection, and is considered to be an effective way to solve traffic congestion, reduce traffic accidents and improve environment pollution. In recent years, vehicle automatic driving technology has been widely concerned and become one of the main directions of the vehicle development in the future.

Generally speaking, an automatic driving system includes the following modules: an environment sensing module, a path planning module, a control execution module and a human-machine interface module. The above four modules are very important to the whole automatic driving system, and affect the intelligent level of the system directly. The path planning module is responsible for planning the lateral movement of a vehicle (that is, ego-vehicle or controlled vehicle), so as to ensure the safety, comfort and stability of the self-driving vehicle. This is an indispensable and vital part of the automatic driving system.

A good automatic driving path planning module needs to comprehensively consider a vehicle nonholonomic constraint, optimality of the generated path and adaptability to different traffic scenarios, and thus a path planning is a key research direction of the automatic driving technology.

At present, path planning methods for autonomous driving mainly include:

(1) a reactive path planning technology proposed by the US invention patent US2016/0313133A1, input of which is obstacle information and lane information detected by the environment sensing module, as well as state information of an ego vehicle; which perform Delaunay triangulation on an environment model established by the environment sensing module, to generate a series of virtual nodes, every virtual node being a vertex of a triangle, and a line between every two vertices is an edge of a triangle. Then, through graph searching and combining search conditions, a path that meets requirements is obtained. The disadvantage of this method is that it needs to preprocess the environment model first to get a large number of virtual nodes, which requires a large amount of storage space. In addition, the path obtained by searching does not necessarily meet the requirement of the vehicle nonholonomic constrain, and the path obtained needs to be modified (2) a path planning method for autonomous driving that is suitable for a structured road such as an expressway, which is proposed by the US invention patent US2016/0129907A1. The method offsets the road center according to the results of global path planning and the current vehicle pose information, to obtain a series of generated virtual targets and corresponding velocity profiles. According to the virtual targets and velocity profiles, and a spline fit is performed on the virtual targets, obtaining candidate paths satisfying a road contour, Then, according to environment information and an objective function, an optimal path meeting requirements is selected as a final path. The disadvantage of this method is that it can only generate a path following the road contour, having poor adaptability.

(3) an automatic driving lane changing path planning method proposed by US invention patent U.S. Pat. No. 9,428,187B2, which describes the lane changing path in the form of quintic polynomial, and determines a target point of polynomial fitting by predicting transverse and longitudinal motion states of an ego vehicle. The disadvantage of this method is that it can only plan a path of a lane change, having poor scalability.

SUMMARY

In order to solve the above technical problems, a first purpose of the present application is to provide a path planning method for autonomous driving, which has a small requirement for storage space, can meet the requirement of a vehicle nonholonomic constraint, and have good adaptability and scalability.

A second purpose of the present application is to provide a path planning system for autonomous driving, which has a small requirement for storage space, can meet the requirement of the vehicle nonholonomic constraint, and have good adaptability and scalability.

A third purpose of the present application is to provide a path planning device for autonomous driving, which has a small requirement for storage space, can meet the requirement of the vehicle nonholonomic constraint, and have good adaptability and scalability.

A first technical solution adopted by the present application is:

A path planning method for autonomous driving, including the following steps:

obtaining environment perception information and vehicle positioning and navigation information, where the environment perception information includes obstacle information, roadside information and lane line information, and the vehicle positioning and navigation information includes vehicle pose and target route;

performing a sub-path generation according to the environment perception information and the vehicle positioning and navigation information, to obtain candidate sub-paths that meet vehicle constraints;

performing a collision detection on the candidate sub-paths that meet the vehicle constraints, to obtain collision-free candidate sub-paths;

performing a sub-path search on the collision-free candidate sub-paths by using A* search algorithm; and obtaining a local path of a vehicle according to a result of the sub-path search.

Further, the performing a sub-path generation according to the environment perception information and the vehicle positioning and navigation information, to obtain candidate sub-paths that meet vehicle constraints, is specifically as follows:

according to the environment perception information and the vehicle positioning and navigation information, obtaining a set of sub-paths corresponding to a set of discrete curvatures k by using a control variate method, where k=1/r, and the curvatures k meet the following constraint: $-k_{max} \leq ki \leq k_{max}$, r is a turning radius corresponding to a path, k is the ith curvature in the set of discrete curvatures, and $k_{max}$, is a given maximum curvature.

Further, the step of performing a sub-path search on the collision-free candidate sub-paths by using an A* search algorithm specifically includes:

calculating a value of an evaluation function of each sub-path in the collision-free candidate sub-paths, where an evaluation factor of the evaluation function of the sub-path include any one of a lateral acceleration, a curvature, a curvature change, a cumulative distance, a difference between an endpoint heading angle and a target heading angle of the sub-path, and a heuristic distance, which correspond to the sub-path, or any combination thereof;

according to the calculated values of the evaluation function and using the A* search algorithm, finding information on a sub-path with an optimal value of the evaluation function and a corresponding parent path from the collision-free candidate sub-paths;

outputting the information on the sub-path with the optimal value of the evaluation function and the corresponding parent path as a result of the sub-path search.

Further, specifically, the step of calculating the value of the evaluation function of each sub-path in the collision-free candidate sub-paths includes:

calculating the lateral acceleration of each sub-path in the collision-free candidate sub-paths, the lateral acceleration a of the sub-path being calculated by the following formula:

$$a = \frac{v^2 \cdot \delta}{[(1 + K \cdot v^2) \cdot (l_f + l_r)]},$$

where v is vehicle velocity, $$\delta = \arctan[(l_f + l_r) \cdot k],$$

$$K = \frac{M}{(l_f + l_r)^2 \cdot \left(\frac{l_r}{k_f} - \frac{l_f}{k_r}\right)},$$

M is ego vehicle mass, k is the curvature, $k_f$ and $k_r$ are tire cornering stiffness of front and rear wheels of the ego vehicle respectively, and $l_f$ and $l_r$ are distances from front and rear axles of the ego vehicle to vehicle center of gravity respectively;

calculating the curvature of each sub-path in the collision-free candidate sub-paths;

calculating the curvature change of each sub-path in the collision-free candidate sub-paths;

calculating the cumulative distance of each sub-path in the collision-free candidate sub-paths, the cumulative distance of the sub-path being calculated by the following formula: d(Current_subpath)=d(parent_subpath)+ds(Current_subpath), where d(Current_subpath) is the cumulative distance of a current sub-path, d(parent_subpath) represents the cumulative distance of the parent path corresponding to the current sub-path, and ds(Current_subpath) represents a path length of the current sub-path;

calculating the difference between the endpoint heading angle and the target heading angle of each sub-path in the collision-free candidate sub-paths, the difference $\Delta\theta$ between the endpoint heading angle and the target heading angle of the sub-path being calculated by the following formula: $\Delta\theta = \arccos[\cos(\theta_{end}) \cdot \cos(\theta_{route}) + \sin(\theta_{end}) \cdot \sin(\theta_{route})]$, where $\theta_{end}$ is the endpoint heading angle of the sub-path, $\theta_{route}$ is the target heading angle; and calculating the heuristic distance of each sub-path in the collision-free candidate sub-paths, the heuristic distance h of the sub-path being calculated by the following formula: $h = d_{min}(S_{end}, \text{route})$, where $S_{end}$ is an endpoint coordinate of the current sub-path, route is a target path given by a global path planning, and $d_{min}(S_{end}, \text{route})$ is a shortest distance from the endpoint of the current sub-path to the target path.

Further, the step of calculating the value of the evaluation function of each sub-path in the collision-free candidate sub-paths also includes the following step:

according to the lateral acceleration, the curvature, the curvature change, the cumulative distance, the difference between the endpoint heading angle and the target heading angle of the sub-path, and the heuristic distance, which correspond to the sub-path, calculating the value of the evaluation function of each sub-path in the collision-free candidate sub-paths, the value of the evaluation function of the sub-path being calculated by the following formula: $f(s) = k_a \cdot a(s) + k_{\Delta k} \cdot \Delta k(s) + k_k \cdot k(s) + k_d \cdot d(s) + k_{\Delta\theta} \Delta\theta(s) + k_h \cdot h(s)$, where s is the current sub-path, f(s) is the value of the evaluation function of the current sub-path, a(s) is the lateral acceleration of the current sub-path, k(s) is the curvature of the current sub-path, $\Delta k(s)$ is the curvature change of the current sub-path, d(s) is the cumulative distance of the current sub-path, $\Delta\theta(s)$ is the difference between the endpoint heading angle and the target heading angle of the current sub-path, h(s) is the heuristic distance of the current sub-path, and $k_a$, $k_{\Delta k}$, $k_k$, $k_d$, $k_{\Delta\theta}$ and $k_h$ are weight coefficients of a(s), $\Delta k(s)$, k(s), d(s), $\Delta\theta(s)$ and h(s), respectively.

Further, the step of calculating the difference between the endpoint heading angle and the target heading angle of each sub-path in the collision-free candidate sub-paths specifically includes:

calculating the endpoint heading angle of each sub-path in the collision-free candidate sub-paths, the endpoint heading angle $\theta_{end}$ of the sub-path being calculated by the following formula:

$$\theta_{end} = \theta_0 + \frac{ds}{r},$$

where $\theta_0$ is a heading angle corresponding to a starting point of the sub-path, ds is a length of the sub-path, and r is a turning radius of the sub-path;

calculating the target heading angle of each sub-path in the collision-free candidate sub-paths; and according to the calculated endpoint heading angle and the target heading angle of the sub-path, calculating the difference $\Delta\theta$ between the endpoint heading angle and the target heading angle of each sub-path in the collision-free candidate sub-paths.

Further, the step of calculating the target heading angle of each sub-path in the collision-free candidate sub-paths specifically includes:

selecting an endpoint of each sub-path in the collision-free candidate sub-paths as a current point;

calculating a shortest distance from the current point to end points of a 8-segment cubic spline segment of the target path, and recording the shortest distance from the current point to the end points of the 8-segment cubic spline segment of the target path as a first shortest distance;

selecting front and rear cubic spline segments corresponding to an end point corresponding to the first shortest distance, and recording the selected front and rear cubic spline segments as a first cubic spline segment and a second cubic spline segment, respectively;

calculating shortest distances from the current point to the first cubic spline segment and the second cubic spline segment respectively by a bisection method;

selecting a relatively smaller value from the shortest distances from the current point to the first cubic spline segment and the second cubic spline segment, as a shortest distance from the current point to the target path; and selecting a heading angle of a point on the target path corresponding to the shortest distance from the current point to the target path, as the target heading angle $\theta_{route}$ of the sub-path.

Further, the step of calculating the shortest distances from the current point to the first cubic spline segment and the second cubic spline segment specifically includes:

Step 1: dividing a given cubic spline segment into n segments according to a given time interval t, to obtain n+1 first type nodes, where the given cubic spline segment is the first cubic spline segment or the second cubic spline segment;

Step 2: calculating a shortest distance from the current point to n+1 first type nodes and a node Ptemp0 corresponding to the shortest distance;

Step 3: dividing two adjacent segments at the node Ptemp0 corresponding to the shortest distance in n segments into n segments according to the parameter t, to obtain n+1 second type nodes;

Step 4: calculating a shortest distance dtemp from the current point to n+1 second type nodes and a node Ptemp corresponding to the shortest distance dtemp; and Step 5: determining whether the shortest distance dtemp is less than a set minimum distance threshold, and if it is, taking dtemp as a shortest distance from the current point to the given cubic spline segment for output; otherwise, letting Ptemp0=Ptemp and returning to Step 3.

A second technical solution adopted by the present application is:

A path planning system for autonomous driving, including:

an information acquisition module, configured to acquire environment perception information and vehicle positioning and navigation information, where the environment perception information includes obstacle information, roadside information and lane line information, and the vehicle positioning and navigation information includes vehicle pose and target route;

a sub-path generation module, configured to generate sub-paths according to the environment perception information and the vehicle positioning and navigation information, to obtain candidate sub-paths that meet vehicle constraints;

a collision detection module, configured to perform a collision detection on the candidate sub-paths that meet the vehicle constraints, to obtain collision-free candidate sub-paths;

a sub-path search module, configured to perform a sub-path search on the collision-free candidate sub-paths by using an A* search algorithm; and a local path generation module, configured to obtain a local path of a vehicle according to a result of the sub-path search.

A third technical solution adopted in the present application is:

A path planning device for autonomous driving, including:

a memory, configured to store a program; and
a processor, configured to execute the program for:

obtaining environment perception information and vehicle positioning and navigation information, where the environment perception information includes obstacle information, roadside information and lane line information, and the vehicle positioning and navigation information includes vehicle pose and target route;

generating sub-paths according to the environment perception information and the vehicle positioning and navigation information, to obtain candidate sub-paths that meet vehicle constraints;

performing a collision detection on the candidate sub-paths that meet the vehicle constraints, to obtain collision-free candidate sub-paths;

performing a sub-path search on the collision-free candidate sub-paths by using an A* search algorithm; and obtaining a local path of a vehicle according to a result of the sub-path search.

The method of the present application has the following beneficial effects: a autonomous driving path can be obtained through the acquisition of the environment perception information and the vehicle positioning and the navigation information, the generation of the sub-paths, the collision detection, the sub-path search and the generation of the local path, thereby the environment model is no longer needed to be preprocessed to get a large number of virtual nodes, requiring a small storage space; obtaining the candidate sub-paths that meet the vehicle constraints through the generation of the sub-paths, and using an A* search algorithm when searching the sub-paths, allow the planned autonomous driving path to better meet the requirement of the vehicle nonholonomic constraint; the acquired environment perception information including obstacle information, roadside information and lane line information, and the vehicle positioning and navigation information including the vehicle pose and the target route, use comprehensively obstacle and lane changing path, lane, vehicle pose and target route information for path planning, this makes the generated autonomous driving path no longer limited by road contour or lane changing path, having better adaptability and scalability.

The system of the present application has the following beneficial effects: including the information acquisition module, the sub-path generation module, the collision detection module, the sub-path search module and the local path generation module, obtaining the autonomous driving path by the acquisition of the environment perception information and the vehicle positioning and navigation information, generation of the sub-paths, the collision detection, the sub-path search and the generation of the local path, makes the environment model no longer needed to be preprocessed to get a large number of virtual nodes, requiring a small storage space; obtaining candidate sub-paths that meet the vehicle constraints through the generation of the sub-paths, and using an A* searching algorithm when searching the sub-paths, allow the planned autonomous driving path better meet the requirement of the vehicle nonholonomic constraint; the acquired environment perception information including the obstacle information, the roadside information, and lane line information, and the vehicle positioning and navigation information including the vehicle pose and the target route, use comprehensively obstacle, lane changing path, lane, vehicle pose and target route information for path planning, which makes the generated autonomous driving path no longer limited by road contour or lane changing path, having better adaptability and scalability.

The device of the present application has the following beneficial effects:

including the memory and the processor, and in the processor, obtaining the autonomous driving path through the acquisition of the environment perception information and the vehicle positioning and navigation information, the generation of the sub-paths, the collision detection, the sub-path search and the generation of the local path, make the environment model no longer needed to be preprocessed to get a large number of virtual nodes, requiring a small storage space; obtaining candidate sub-paths that meet the vehicle constraints through the generation of the sub-paths, and using an A* searching algorithm when searching the sub-paths, allow the planned autonomous driving path better meet the requirement of the vehicle nonholonomic constraint; the acquired environment perception information including the obstacle information, the roadside information, and the lane line information, and the vehicle positioning and navigation information including the vehicle pose and the target route, use comprehensively obstacle, lane changing path, lane, vehicle pose and target route information for path planning, which makes the generated autonomous driving path no longer limited by road contour or lane changing path, having better adaptability and scalability.

DESCRIPTION OF EMBODIMENTS

Figure 1:
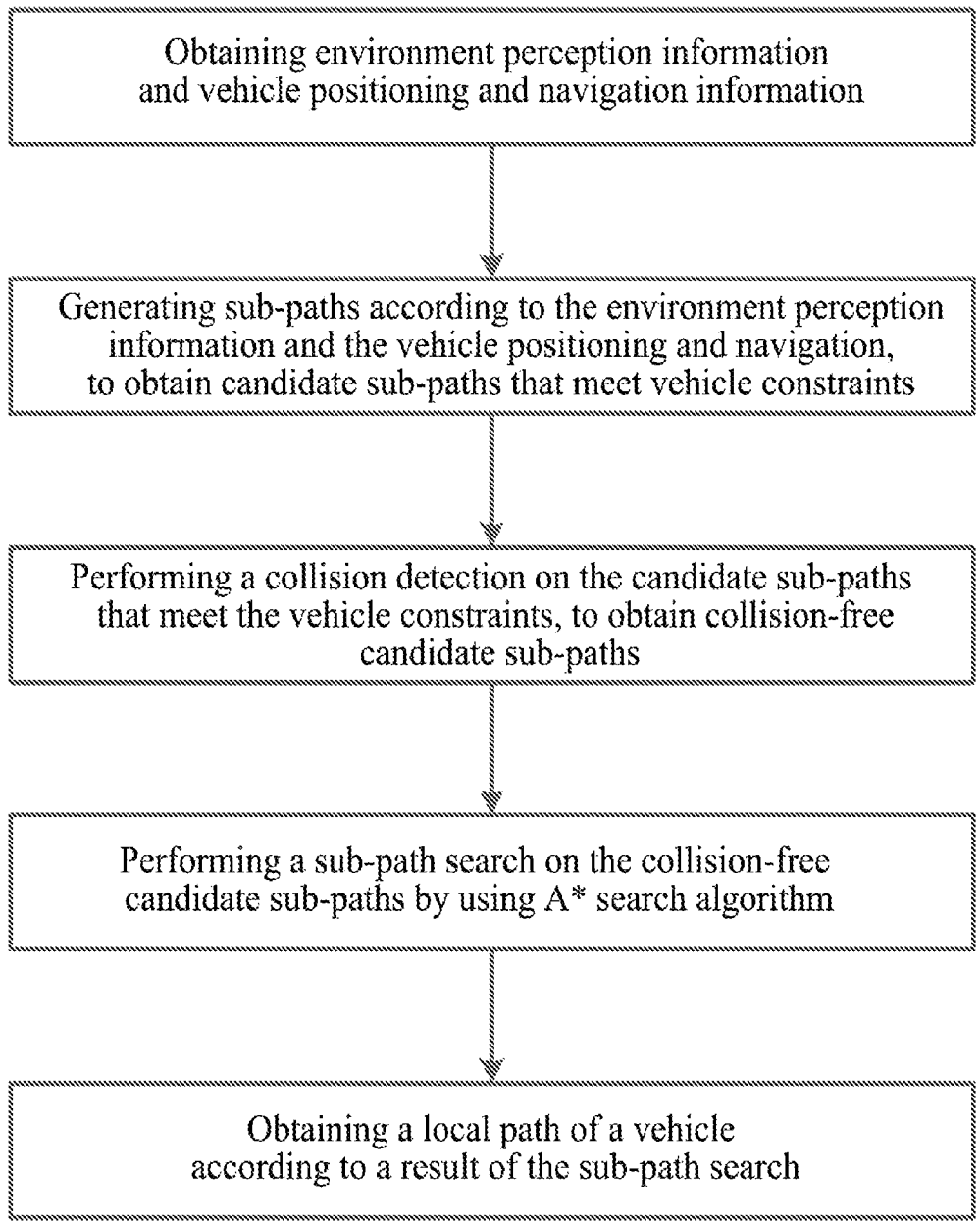
FIG. 1 is a flow chart of a path planning method for autonomous driving of the present application.

Referring to FIG. 1, a path planning method for autonomous driving includes the following steps:

obtaining environment perception information and vehicle positioning and navigation information, where the environment perception information includes obstacle information, roadside information and lane line information, the vehicle positioning and navigation information includes vehicle pose and target route;

generating sub-paths according to the environment perception information and the vehicle positioning and navigation, to obtain candidate sub-paths that meet vehicle constraints;

performing a collision detection on the candidate sub-paths that meet the vehicle constraints, to obtain collision-free candidate sub-paths;

performing a sub-path search on the collision-free candidate sub-paths by using A* search algorithm;

obtaining a local path of a vehicle according to a result of the sub-path search.

where the collision detection aims to eliminate possible sub-paths with collision occurrence and ensure that the local path obtained finally is collision-free and safety. In the present application, a concept of path contour can be used for obstacle collision detection, that is, a boundary contour formed by driving of the vehicle along a path from a start pose to an end pose is taken as a whole, and the collision detection is carried out by a geometric method. The local path of the vehicle is the result of the path planning for autonomous driving.

Further, as a preferred embodiment, the step of generating sub-paths according to the environment perception information and the vehicle positioning and navigation information, to obtain candidate sub-paths that meet vehicle constraints, specifically is as follows:

according to the environment perception information and the vehicle positioning and navigation information, obtaining a set of sub-paths corresponding to a set of discrete curvatures k by using a control variate method, where k=1/r, and the curvatures k meet the following constraint: $-kmax \leq ki \leq kmax$, where r is a turning radius corresponding to a path, ki is the ith curvature in the set of discrete curvatures, and kmax is a given maximum curvature.

Further, as a preferred embodiment, the step of performing a sub-path search on the collision-free candidate sub-paths by using an A* search algorithm specifically includes:

calculating a value of an evaluation function of each sub-path in the collision-free candidate sub-paths, where an evaluation factor of the evaluation function of the sub-path include any one of a lateral acceleration, a curvature, a curvature change, a cumulative distance, a difference between an endpoint heading angle and a target heading angle of the sub-path, and a heuristic distance, which correspond to the sub-path, or any combination thereof;

according to the calculated values of the evaluation function and using an A* search algorithm, finding information on a sub-path with an optimal value of the evaluation function and a corresponding parent path from the collision-free candidate sub-paths;

outputting the information on the sub-path with the optimal value of the evaluation function and the corresponding parent path as a result of the sub-path search.

The present application adds evaluation items such as curvature change and heading angle difference into the objective function (i.e. evaluation function) of the search algorithm, which can ensure the final planning path as smooth as possible and reduction of the overshoot as much as possible; by adding evaluation items on the lateral acceleration in the evaluation function, it is ensured that the final planning path can meet a requirement of passenger comfort as much as possible.

Further, as a preferred embodiment, specifically, the step of calculating the value of the evaluation function of each sub-path in the collision-free candidate sub-paths includes:

calculating the lateral acceleration of each sub-path in the collision-free candidate sub-paths, the lateral acceleration a of the sub-path being calculated by the following formula:

$$a = \frac{v^2 \cdot \delta}{\left[(1 + K \cdot v^2) \cdot (l_f + l_r)\right]},$$

where v is vehicle velocity, $\delta = \arctan[(l_f+l_r)\cdot k]$, M is ego vehicle mass, $$K = \frac{M}{(l_f + l_r)^2 \cdot \left(\frac{l_r}{k_f} - \frac{l_f}{k_r}\right)},$$

where k is the curvature, $k_f$ and $k_r$ are tire cornering stiffness of front and rear wheels of the vehicle respectively, $l_f$ and $l_r$ are distances from front and rear axles of the vehicle to vehicle center of gravity respectively;

calculating the curvature of each sub-path in the collision-free candidate sub-paths;

calculating the curvature change of each sub-path in the collision-free candidate sub-paths;

calculating the cumulative distance of each sub-path in the collision-free candidate sub-paths, the cumulative distance of the sub-path being calculated by the following formula: d(Current_subpath)=d(parent_subpath)+ds(Current_subpath), where d(Current_subpath) is the cumulative distance of a current sub-path, d(parent_subpath) represents the cumulative distance of the parent path corresponding to the current sub-path, and ds(Current_subpath) represents a path length of the current sub-path;

calculating the difference between the endpoint heading angle and the target heading angle of each sub-path in the collision-free candidate sub-paths, the difference $\Delta\theta$ between the endpoint heading angle and the target heading angle, of the sub-path being calculated by the following formula: $\Delta\theta = \arccos[\cos(\theta_{end})\cdot\cos(\theta_{route})+\sin(\theta_{end})\cdot\sin(\theta_{route})]$, where $\theta_{end}$ is the endpoint heading angle of the sub-path, $\theta_{route}$ is the target heading angle; and calculating the heuristic distance of each sub-path in the collision-free candidate sub-paths, the heuristic distance h of the sub-path being calculated by the following formulate: $h = d_{min}(S_{end}, \text{route})$, where $S_{end}$ is an endpoint coordinate of the current sub-path, route is a target path given by a global path planning, and $d_{min}(S_{end}, \text{route})$ is the shortest distance from the endpoint of the current sub-path to the target path.

Further, as an preferred embodiment, the step of calculating the value of the evaluation function of each sub-path in the collision-free candidate sub-paths also includes the following steps:

according to the lateral acceleration, the curvature, the curvature change, the cumulative distance, the difference between the endpoint heading angle and the target heading angle of the sub-path, and the heuristic distance, of the sub-path, calculating the value of the evaluation function of each sub-path in the collision-free candidate sub-paths, the value of the evaluation function of the sub-path being calculated by the following formula: $f(s) = k_a \cdot a(s) + k_{\Delta k} \cdot \Delta k(s) + k_k \cdot k(s) + k_d \cdot d(s) + k_{\Delta\theta} \Delta\theta(s) + k_h \cdot h(s)$, where s is the current sub-path, f(s) is the value of the evaluation function of the current sub-path, a(s) is the lateral acceleration of the current sub-path, k(s) is the curvature of the current sub-path, $\Delta k(s)$ is the curvature change of the current sub-path, d(s) is the cumulative distance of the current sub-path, $\Delta\theta(s)$ is the difference between the endpoint heading angle and the target heading angle, of the current sub-path, h(s) is the heuristic distance of the current sub-path, and $k_a, k_{\Delta k}, k_k, k_d, k_{\Delta\theta}, k_h$ are weight coefficients of a(s), $\Delta k(s)$, k(s), d(s), $\Delta\theta(s)$ and h(s), respectively.

Where Route is the target path given by the global path planning, Route is included in the vehicle positioning and navigation information.

Further, as a preferred embodiment, the step of calculating the difference between the endpoint heading angle and the target heading angle of each sub-path in the collision-free candidate sub-paths specifically includes:

calculating the endpoint heading angle of each sub-path in the collision-free candidate sub-paths, the endpoint heading angle $\theta_{end}$ of the sub-path being:

$$\theta_{end} = \theta_0 + \frac{ds}{r},$$

where $\theta_0$ is a heading angle corresponding to a starting point of the sub-path, ds is a length of the sub-path, and r is a turning radius of the sub-path;

calculating the target heading angle of each sub-path in the collision-free candidate sub-paths;

according to the calculated endpoint heading angle and target heading angle of the sub-path, calculating the difference $\Delta\theta$ between the endpoint heading angle and the target heading angle of each sub-path in the collision-free candidate sub-paths.

Further, as a preferred embodiment, the step of calculating the target heading angle of each sub-path in the collision-free candidate sub-paths specifically includes:

selecting an endpoint of each sub-path in the collision-free candidate sub-paths as a current point;

calculating a shortest distance from the current point to end points of a 8-segment cubic spline segment of the target path, and recording the shortest distance from the current point to the end points of the 8-segment cubic spline segment of the target path as a first shortest distance;

selecting front and rear cubic spline segments corresponding to an end point corresponding to the first shortest distance, and recording the front and rear cubic spline segments as a first cubic spline segment and a second cubic spline segment, respectively;

calculating shortest distances from the current point to the first cubic spline segment and the second cubic spline segment respectively by a bisection method;

selecting a relatively smaller value from the shortest distances from the current point to the first cubic spline segment and the second cubic spline segment, as a shortest distance from the current point to the target path; and selecting a heading angle of a point on the target path corresponding to the shortest distance from the current point to the target path as the target heading angle $\theta_{route}$ of the sub-path.

Where the target path is the center line of the vehicle, and the center line of the vehicle is described by the 8-segment cubic spline segment. The selecting a relatively smaller value from the shortest distances from the current point to the first cubic spline segment and the second cubic spline segment as a shortest distance from the current point to the target path refers to: if the shortest distance from the current point to the first cubic spline segment is less than the shortest distance from the current point to the second cubic spline segment, then the shortest distance from the current point to the target path is equal to the shortest distance from the current point to the first cubic spline segment.

Further, as a preferred embodiment, the step of calculating the shortest distances from the current point to the first cubic spline segment and the second cubic spline segments specifically includes:

Step 1: dividing a given cubic spline segment into n segments according to a given time interval t, to obtain n+1 first type nodes, where the given cubic spline segment is the first cubic spline segment or the second cubic spline segment;

Step 2: calculating a shortest distance from the current point to n+1 first type nodes and a node Ptemp0 corresponding to the shortest distance;

Step 3: dividing two adjacent segments at the node Ptemp0 corresponding to the shortest distance in n segments into n segments according to the parameter t, to obtain n+1 second type nodes;

Step 4: calculating a shortest distance dtemp from the current point to n+1 second type nodes and a node Ptemp corresponding to the shortest distance dtemp; and Step 5: determining whether the shortest distance dtemp is less than a set minimum distance threshold, and if it is, taking dtemp as a shortest distance from the current point to the given cubic spline segment for output; otherwise, letting Ptemp0=Ptemp and returning to Step 3.

Where letting Ptemp0=Ptemp and returning to Step 3 means returning to the node Ptemp corresponding to the shortest distance dtemp, to make Ptemp0=Ptemp, and then the above steps are repeated (i.e. repeating Step 3 and Step 4) until the shortest distance dtemp is less than the set minimum distance threshold.

Corresponding to the method of FIG. 1, the present application also provides a path planning system for autonomous driving, including:

an information acquisition module, configured to acquire environment perception information and vehicle positioning and navigation information, where the environment perception information includes obstacle information, roadside information and lane line information, and the vehicle positioning and navigation information includes vehicle pose and target route;

a sub-path generation module, configured to generate sub-paths according to the environment perception information and the vehicle positioning and navigation information, to obtain candidate sub-paths that meet vehicle constraints;

a collision detection module, configured to perform a collision detection on the candidate sub-paths that meet the vehicle constraints, to obtain collision-free candidate sub-paths;

a sub-path search module, configured to perform a sub-path search on the collision-free candidate sub-paths by using an A* search algorithm; and a local path generation module, configured to obtain a local path of a vehicle according to a result of the sub-path search.

Corresponding to the method of FIG. 1, the present application also provides a path planning device for autonomous driving, including:

a memory, configured to store a programs; and a processor, configured to execute the program for:

obtaining environment perception information and vehicle positioning and navigation information, where the environment perception information includes obstacle information, roadside information and lane line information, and the vehicle positioning and navigation information includes vehicle pose and target route;

generating sub-paths according to the environment perception information and the vehicle positioning and navigation information, to obtain candidate sub-paths that meet vehicle constraints;

performing a collision detection on the candidate sub-paths that meet the vehicle constraints, to obtain collision-free candidate sub-paths;

performing a sub-path search on the collision-free candidate sub-paths by using an A* search algorithm; and obtaining a local path of a vehicle according to a result of the sub-path search.

The present application will be further described and illustration below in combination with the drawings accompanying the description and a specific embodiment.

Embodiment 1

In view of the great demand for storage space in prior art, uncapable of meeting the requirements for the vehicle nonholonomic constraint, poor adaptability and poor scalability, the present application specially designs a new path planning method, system and device for autonomous driving.

Figure 2:
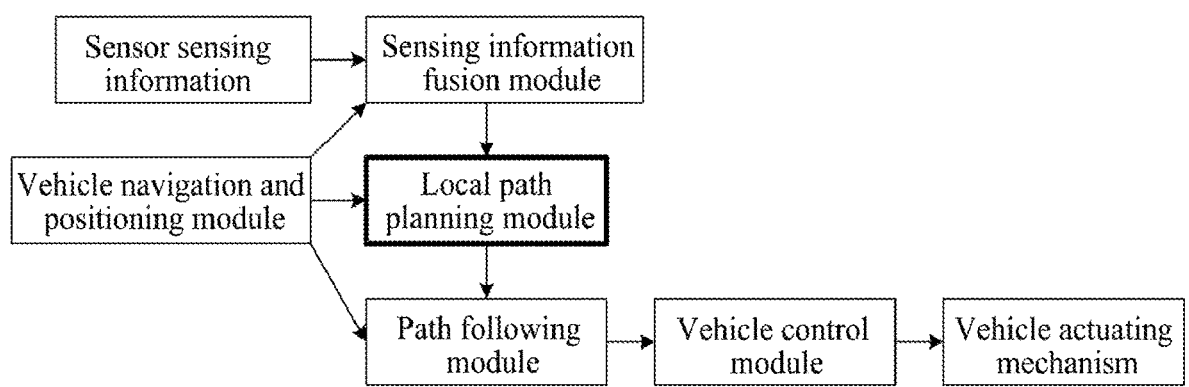
FIG. 2 is a structural block diagram of an automatic driving system in Embodiment 1 of the present application.

A block diagram of the automatic driving system in this embodiment is shown in FIG. 2, where according to environmental model information provided by a sensing information fusion module, and the vehicle pose information and the global route provided by a vehicle navigation and positioning module, a local path planning module carries out a local path planning, and outputs a result of the planning to a path following module. The path planning method for autonomous driving of the present application is mainly realized by the local path planning module, and thus other modules of the autonomous driving system will not be repeated.

Figure 3:
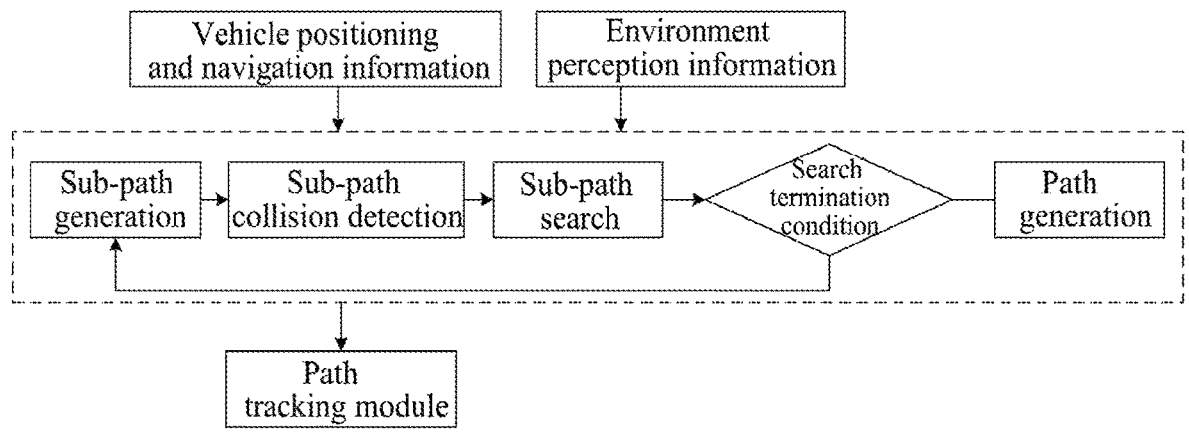
FIG. 3 is an algorithm framework diagram of a local path planning module in Embodiment 1 of the present application.

An algorithm diagram of the local path planning module of the present application is shown in FIG. 3. From FIG. 3, it can be seen that an input of the local path planning module is the environment perception information and vehicle positioning and navigation information, and an output thereof is a local path. Where the environment perception information mainly includes obstacle information, roadside information and lane line information; the vehicle positioning and navigation information mainly includes vehicle pose ($x_v$, $y_v$, $\theta_v$) and target route. In the present application, the target route is a lane center line, which is described by a 8-segment cubic spline segment.

Figure 4:
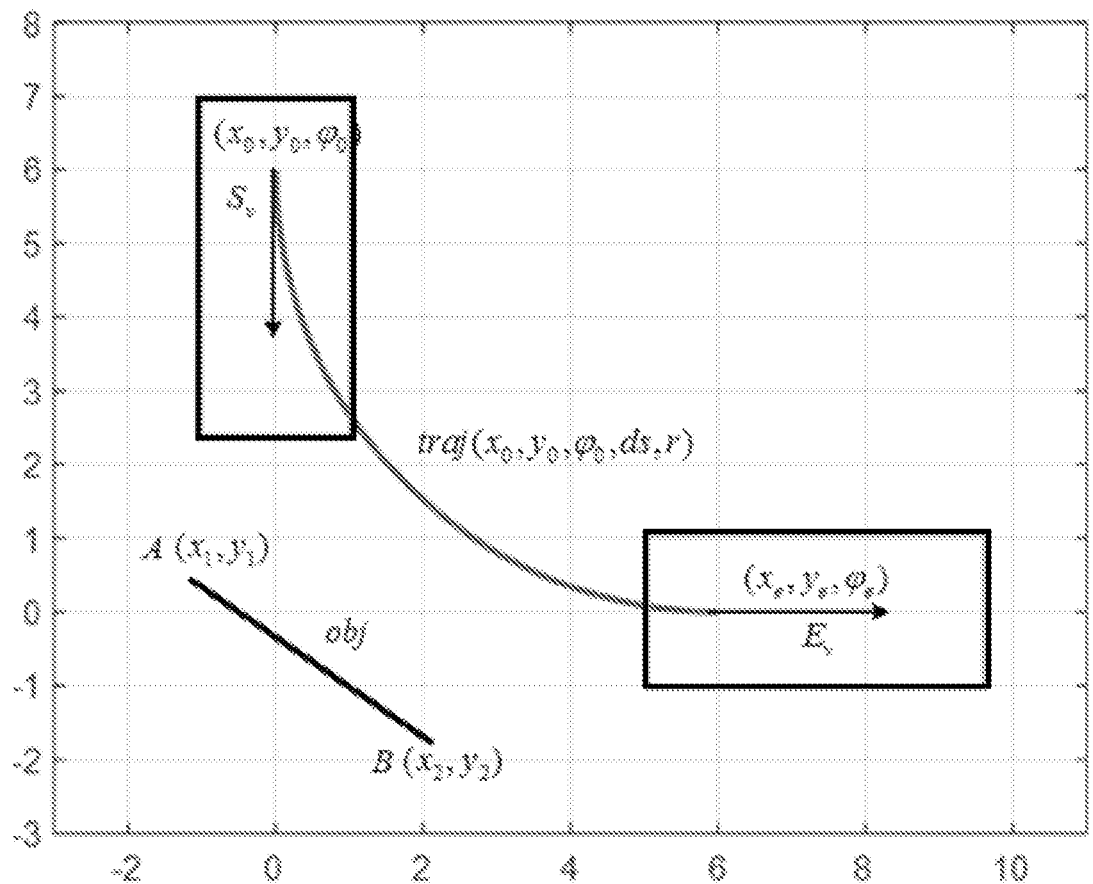
FIG. 4 is a schematic diagram of a path, an obstacle and a vehicle outline in Embodiment 1 of the present application.

As shown in FIG. 3, the local path planning module of the present application includes four modules: a sub-path generation module, a sub-path collision detection module, a sub-path search module and a path generation module. In the present application, the sub-path is represented by five parameters ($x_0$, $y_0$, $\varphi_0$, ds, r), where ($x_0$, $y_0$, $\varphi_0$) is a vehicle starting pose corresponding to the sub-path, as is a path length, where if ds is positive, it means the vehicle is driving forward, and if ds is negative, it means the vehicle is driving backward; r is a turning radius corresponding to the path, where if r is positive, it means the vehicle is turning left, if r is negative, it means the vehicle is turning right, and when r=0, it means the vehicle is driving in a straight line. In the present application, any obstacle obj is represented by a line segment, which is described by two end points A ($x_1$, $y_1$) and B ($x_2$, $y_2$). In the present application, in the process of the collision detection, the vehicle outline is simplified as a rectangle, and specific collision detection parameters mainly include three parameters: vehicle length len, vehicle width width, and rear suspension length h0. In order to drive the vehicle safely on a planned path, a certain distance must be maintained between the outer contour of the vehicle and the obstacle. For this reason, the present application also performs a certain expansion swell of the vehicle's outline parameters during the collision detection to ensure that there is a certain safety distance between the real vehicle and the obstacle. Therefore, in the present application, the vehicle outline is represented by four parameters: len, width, h0 and swell. A schematic diagram of vehicle outline, sub-path and obstacle of the present application is shown in FIG. 4.

The implementation method of each component module in the local path planning algorithm of the present application is described in detail below.

(1) Sub-Path Generation Module

The sub-path generation module is configured to predict the vehicle status, and generate a series of candidate sub-paths that meet vehicle constraints according to a current vehicle pose.

Figure 5:
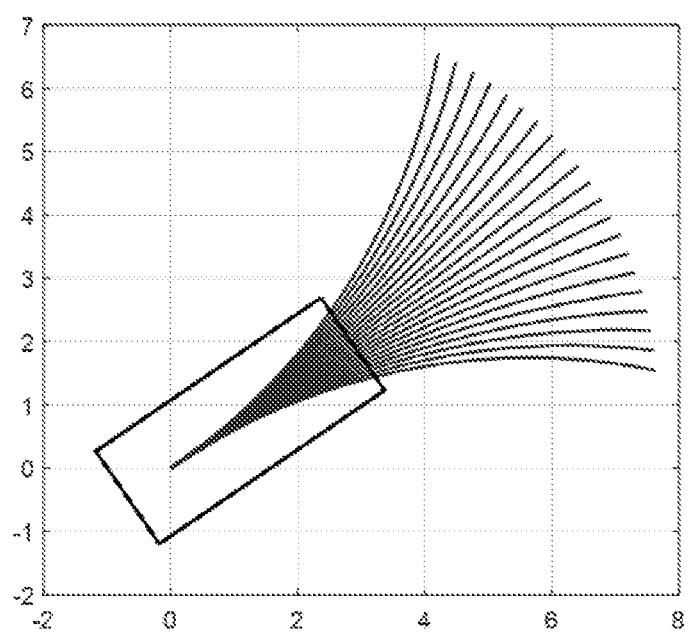
FIG. 5 is a schematic diagram of current poses and sub-paths of a vehicle under different curvatures in Embodiment 1 of the present application.

As defined previously, any one sub-path is described by five parameters $(z_0, y_0, \varphi_0, ds, r)$, and thus when $(x_0, y_0, \varphi_0, ds)$ is fixed, according to the control variable method, different sub-paths can be obtained according to different parameters r. The present application can generate sub-paths through variable curvatures k, where k and r meet the following requirement: $k=1/r$. Specifically, under the action of a set of discrete curvatures k, a set of discrete sub-paths can be obtained. FIG. 5 gives a schematic diagram of the current vehicle pose and sub-path under different curvatures k.

Due to the constraint of vehicle turning radius, in the sub-path generation module, it is also necessary to constrain the k as follows:

$$-k_{max} \leq k_i \leq k_{max}.$$

(2) Sub-Path Collision Detection Module

The sub-path collision detection process is a very important part in the local path planning of the present application, which is used to ensure that the final local path result is free of collision. The present application adopts a concept of path contour to carry out obstacle collision detection, that is, a boundary contour formed by driving of the vehicle along a path from a start pose to an end pose is taken as a whole, and the collision detection is carried out by a geometric method.

(3) Sub-Path Search Module

Figure 6:
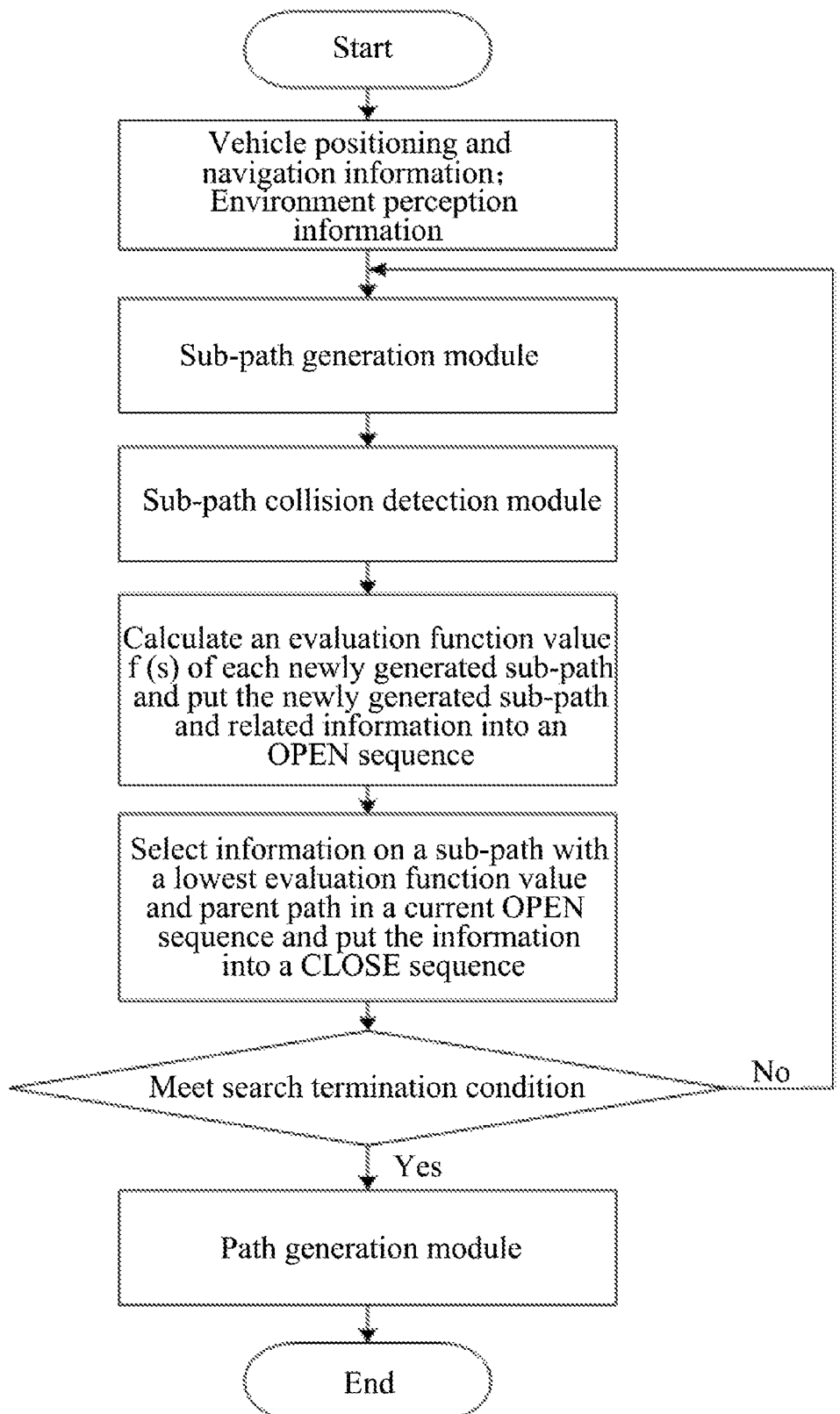
FIG. 6 is a flowchart of a sub-path search in Embodiment 1 of the present application.

As shown in FIG. 6, based on the idea and rules of an A* search algorithm, the sub-path search module of the present application evaluates the sub-paths in an OPEN set (i.e. an OPEN sequence) by constructing an evaluation function, and saves sub-paths with lowest comprehensive evaluation values (i.e. lowest evaluation function values) into a CLOSE sequence, which is used for a parent path of the sub-path generation module.

1) Evaluation Function

The evaluation function (i.e. objective function) is used to evaluate the sub-paths to ensure the comfort, efficiency and optimality of the final path. In the present application, the evaluation function is composed of six parts, including lateral acceleration, curvature, curvature change, cumulative distance, difference between the endpoint heading angle and the target heading angle of the sub-path, and heuristic distance, which correspond to the sub-path.

The details of the above six parts is as follows:

a) Lateral Acceleration

For passengers, the lateral acceleration is one of the most important indexes for reflecting the comfort of the vehicle. Too large lateral acceleration is not good for the comfort. In combination with a two degree of freedom vehicle model, the present application calculates the lateral acceleration a of each sub-path by the following formula:

$$a = \frac{v^2 \cdot \delta}{[(1 + K \cdot v^2) \cdot (l_f + l_r)]},$$

where $\delta = \arctan[(l_f + l_r) \cdot k]$, $$K = \frac{M}{(l_f + l_r)^2 \cdot \left(\frac{l_r}{k_f} - \frac{l_f}{k_r}\right)},$$

M is vehicle mass, v is vehicle velocity, $k_f$ and $k_r$ are tire cornering stiffness of front and rear wheels of the vehicle respectively, $l_f$ and $l_r$ are the distance from front and rear axles to the vehicle center of gravity respectively, k is the curvature.

b) Curvature

In the process of automatic driving, a very important control goal is to make the lateral input as small as possible under the premise of ensuring safety, so as to ensure the stability and comfort of the vehicle. Therefore, in the process of state (i.e. sub-path) search, on the premise of ensuring collision-free, the state in which steer angle input of steering wheel (i.e. curvature) is smaller has priority to be selected.

c) Curvature Change

In the process of automatic driving, the path should be as smooth as possible under the premise of ensuring safety with no collision. Therefore, in order to ensure the transition between the two adjacent sub-paths is smoother, the present application adds a limit on the curvature change of the two adjacent sub-paths in the evaluation function, which ensures the final planned path is as smooth as possible.

d) Cumulative Distance

The cumulative distance represents a distance from the initial vehicle state to the current vehicle state. In the present application, since the length of each segment of the sub-path is known, the cumulative distance of the sub-path can be obtained by calculating the sum of the cumulative distance of the current segment of the sub-path and the cumulative distance of its corresponding parent path, and its calculation method can be expressed by the following formula:

$$d(\text{Current\_subpath}) = d(\text{parent\_subpath}) + ds(\text{Current\_subpath})$$

where, d(parent_subpath) represents the cumulative distance of the parent path, and ds(Current_subpath) represents the path length of the current sub-path.

e) Difference Between Endpoint Heading Angle and Target Heading Angle of Sub-Path The heading angle difference is used to limit the finally planned path to follow the target path as much as possible on the premise of ensuring safety with no collision, without large heading fluctuation, so as to ensure the smoothness of the path. In the present application, the formula for calculating the endpoint heading angle $\theta_{end}$ of the sub-path is:

$$\theta_{end} = \theta_0 + \frac{ds}{r}$$

where $\theta_0$ is the heading angle corresponding to the starting point of the sub-path, ds is the length of the sub-path, and r is the turning radius of the sub-path.

Figure 7:
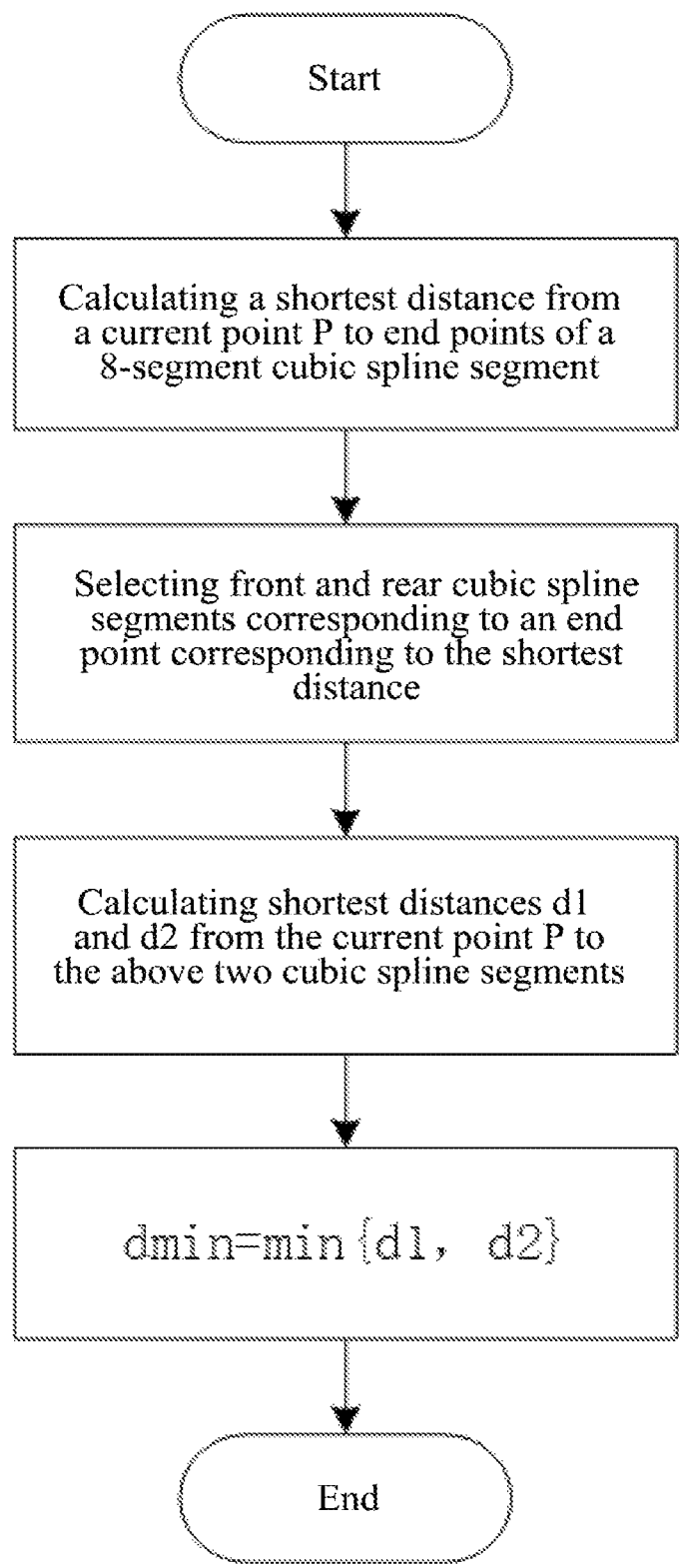
FIG. 7 is a flowchart of calculating a shortest distance from a current point P to a target path in Embodiment 1 of the present application.

The target heading angle $\theta_{route}$ of the present application is determined by calculating the heading angle of the point on the target path corresponding to the shortest distance dmin from the end point of the sub-path to the target path, and a calculation algorithm flow is shown in FIG. 7.

Figure 8:
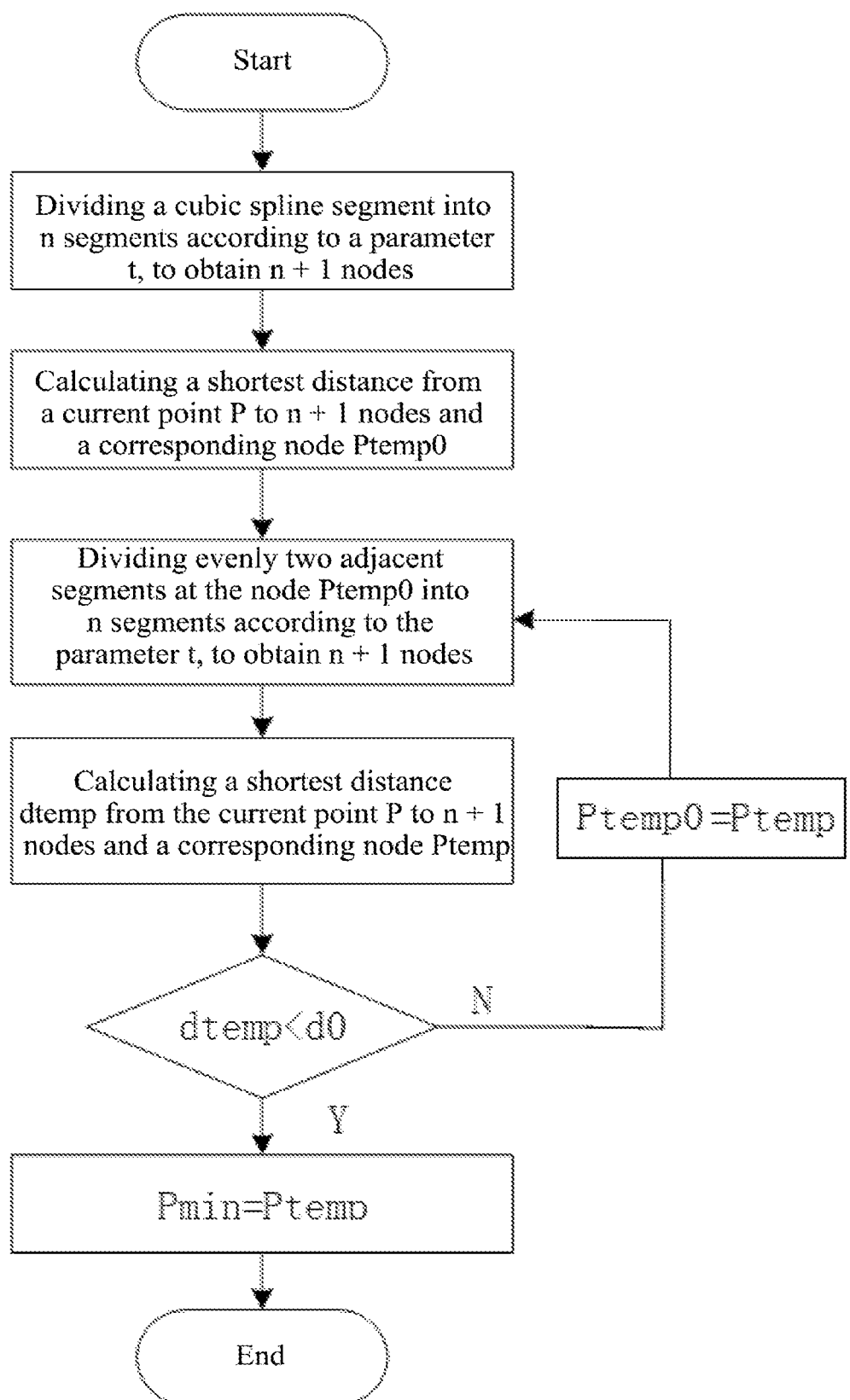
FIG. 8 is a flowchart of calculating a shortest distance from the current point P to a given cubic spline segment in Embodiment 1 of the present application.

For a given section of cubic spline curve, the idea of bisection method can be used to approximately solve the shortest distance Pmin from the end of sub-path to this section of cubic spline curve. A specific algorithm flow is shown in FIG. 8. In FIG. 8, $d_0$ is a set minimum distance threshold. Through two flow charts shown in FIG. 7 and FIG. 8, the shortest distance from the current point P to the target path and the point $P_{route}$ on the target path corresponding to the shortest distance are finally solved, and then the target heading angle $\theta_{route}$ is determined by the heading angle of the point $P_{route}$.

The heading angle difference $\Delta\theta$ is calculated by an included angle formula of vector, which is as follows:

$$\Delta\theta = ar\cos[\cos(\theta_{end})\cdot\cos(\theta_{route})+\sin(\theta_{end})\cdot\sin(\theta_{route})]$$

F) Heuristic Distance

Heuristic distance is used to represent the distance between the current sub-path and the target. In the present application, the heuristic distance h is represented by the shortest distance from the end point of the current sub-path to the target path, and is calculated by the following formula:

$$h = d_{min}(S_{end}, \text{route})$$

where $S_{end}$ is an endpoint coordinate of the current sub-path, route is the target path given by the global path planning, and $d_{min}(S_{end}, \text{route})$ is the shortest distance from the endpoint of the current sub-path to the target path.

In conclusion, the expression of the evaluation function f(s) of the present application is as follows:

$$f(s) = k_a \cdot a(s) + k_{\Delta k} \cdot \Delta k(s) + k_k \cdot k(s) + k_d \cdot d(s) + k_{\Delta\theta} \Delta\theta(s) + k_h \cdot h(s)$$

where s is the current sub-path, a(s) is the lateral acceleration, k(s) is the curvature, $\Delta k(s)$ is the curvature change, d(s) is the cumulative distance, $\Delta\theta(s)$ is the heading angle difference, h(s) is the heuristic distance. In the above formula, each evaluation index has a corresponding weight coefficient in front of it, and the corresponding weight coefficient can be modified according to an actual situation.

2) Search

Figure 9:
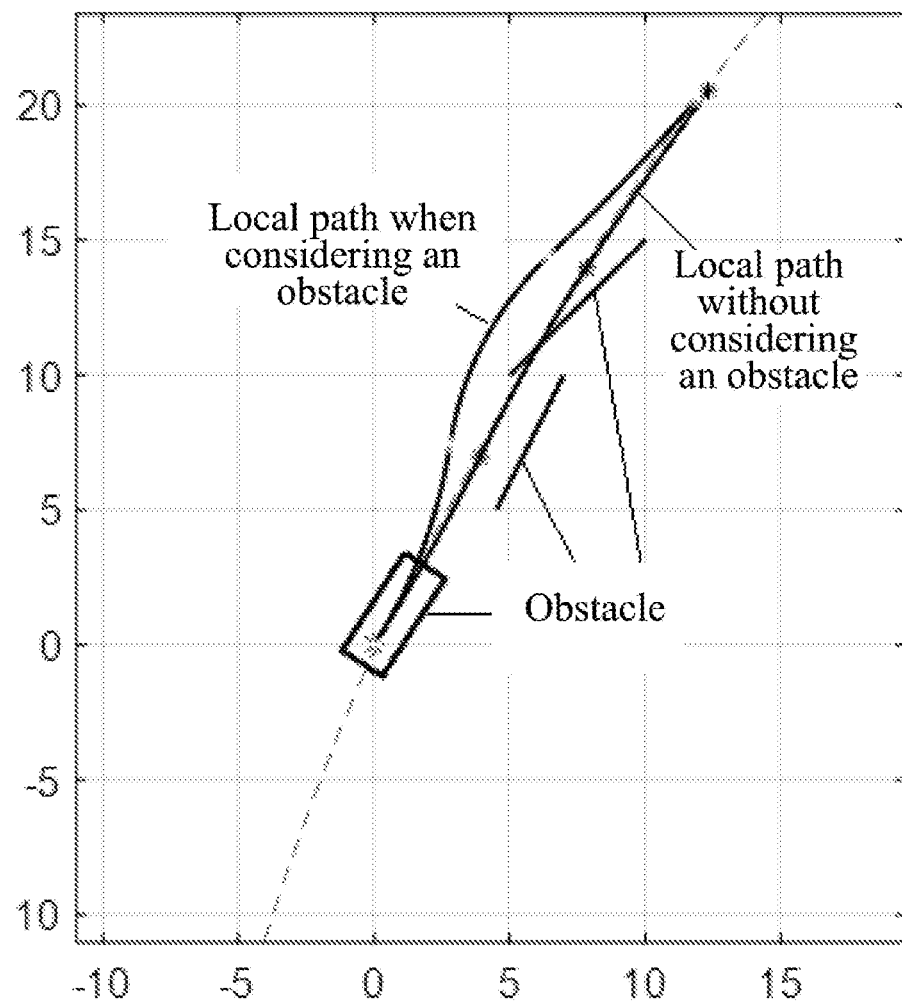
FIG. 9 is a diagram of path planning result in Embodiment 1 of the present application.

The sub-path search module of the present application uses an A* algorithm as the sub-path search algorithm. The search flow is shown in FIG. 6, and the search result is shown in FIG. 9. It can be seen from FIG. 9 that the sub-path search result of the present application meets the requirements of collision-free, smooth and driving along the target path as much as possible.

(4) Local Path Generation Module

When a search termination condition is meeted, the path generation sub-module will generate a currently expected driving path of the ego vehicle (i.e. local path of the ego vehicle) according to a search result of the sub-path search module above and a parent-child relationship between the sub-paths. A path planning result of the present application is as shown in FIG. 9. The local path planning result is a straight line segment without considering obstacles, and the local path planning result is a curved curve segment while considering obstacles. From the path shown in FIG. 9, it can be seen that the search result of the sub-path of the present application meets the comprehensive evaluation requirements of the evaluation function, which are: first, collision-free in the search result; second, the search result meets the requirement of curvature change, and the path is smooth; third, the search result meets the requirements of driving along the local path as far as possible, and the heading angle having no large overshoot.

Since the evaluation index of curvature change is added to the sub-path search algorithm, the search algorithm can ensure the curvature mutation at the intersection of two adjacent sub-paths is as small as possible. At the same time, the output result of the present application will be sent to a subsequent path tracking module for execution, and the curvature change at the transition will be processed in the path tracking module, so as to ensure the stable driving of the vehicle, and at the same time, also ensure that a deviation between an actual driving track of the vehicle and the local path output by the present application reaches a small value, realizing the driving safety of the ego vehicle.

Compared with the existed art, the present application has the following advantages:

(1) using a line segment to express the obstacle, and using a straight line-arc to express the path, is convenient for storage and calculation, as well as the construction of a mathematical model;

(2) using an arc segment sub-path as the state and using the A* algorithm as the search algorithm make the planned path better meet the requirement of vehicle nonholonomic constraint;

(3) eliminate possible collision sub-paths through the collision detection ensures that the finally planned path is safety with no collision;

(4) adding evaluation items such as curvature change and heading angle difference to the objective function of the search algorithm ensures that the finally planned path is as smooth as possible, and overshoot is reduced as much as possible;

(5) adding the evaluation item of lateral acceleration in the evaluation function ensures that the finally planned path can meet the requirement of passenger comfort as much as possible; and (6) using information on obstacle, lane changing path, lane, vehicle pose and target route comprehensively to carry out path planning achieves functions of obstacle avoidance, lane changing and lane keeping, which can reduce a state switching of decision module as much as possible.

The above is a detailed description of preferred embodiments of the present application, but the present application is not limited to the embodiments. Those skilled in the art can make various equivalent modifications or replacements without departing from the spirit of the present application, and these equivalent modifications or replacements are included in the scope defined in the claims of the present application.

What is claimed is:

1. A path planning method for autonomous driving, comprising the following steps:
    obtaining environment perception information and vehicle positioning and navigation information, wherein the environment perception information comprises obstacle information, roadside information and lane line information, and the vehicle positioning and navigation information comprises vehicle pose and target route;
    performing a sub-path generation according to the environment perception information and the vehicle positioning and navigation information, to obtain candidate sub-paths that meet vehicle constraints;
    performing a collision detection on the candidate sub-paths that meet the vehicle constraints, to obtain collision-free candidate sub-paths;
    performing a sub-path search on the collision-free candidate sub-paths by using an A* search algorithm; and obtaining a local path of a vehicle according to a result of the sub-path search;

wherein the step of performing a sub-path search on the collision-free candidate sub-paths by using an A* search algorithm is specifically comprises:

calculating a value of an evaluation function of each sub-path in the collision-free candidate sub-paths, wherein an evaluation factor of the evaluation function of the sub-path comprises any one of a lateral acceleration, a curvature, a curvature change, a cumulative distance, a difference between an endpoint heading angle and a target heading angle of the sub-path, and a heuristic distance, which correspond to the sub-path, or any combination thereof;

according to the calculated values of the evaluation function and using the A* search algorithm, finding information on a sub-path with an optimal value of the evaluation function and a corresponding parent path from the collision-free candidate sub-paths; and outputting the information on the sub-path with the optimal value of the evaluation function and the corresponding parent path as a result of the sub-path search.

2. The path planning method for autonomous driving according to claim 1, wherein the step of performing a sub-path generation according to the environment perception information and the vehicle positioning and navigation information, to obtain candidate sub-paths that meet vehicle constraints, is specifically as follows:

according to the environment perception information and the vehicle positioning and navigation information, obtaining a set of sub-paths corresponding to a set of discrete curvatures k by using a control variate method, wherein k=1/r, and the curvatures k meet the following constraint: $-k_{max} \leq k_i \leq k_{max}$, r is a turning radius corresponding to a path, $k_i$ is the ith curvature in the set of discrete curvatures, and $k_{max}$ is a given maximum curvature.

3. The path planning method for autonomous driving according to claim 1, wherein the step of calculating a value of an evaluation function of each sub-path in the collision-free candidate sub-paths specifically comprises:

calculating the lateral acceleration of each sub-path in the collision-free candidate sub-paths, the lateral acceleration a of the sub-path being calculated by the following formula:

$$a = \frac{v^2 \cdot \delta}{[(1 + K \cdot v^2) \cdot (l_f + l_r)]},$$

wherein v is vehicle velocity, $$\delta = \arctan[(l_f + l_r) \cdot k],$$

$$K = \frac{M}{(l_f + l_r)^2 \cdot \left(\frac{l_r}{k_f} - \frac{l_f}{k_r}\right)},$$

M is ego vehicle mass, k is the curvature, $k_f$ and $k_r$ are tire cornering stiffness of front and rear wheels of the ego vehicle respectively, and $l_f$ and $l_r$ are distances from front and rear axles of the ego vehicle to vehicle center of gravity respectively;

calculating the curvature of each sub-path in the collision-free candidate sub-paths;

calculating the curvature change of each sub-path in the collision-free candidate sub-paths;

calculating the cumulative distance of each sub-path in the collision-free candidate sub-paths, the cumulative distance of the sub-path being calculated by the following formula: d(Current_subpath)=d(partent_subpath)+ds(Current_subpath), wherein d(Current_subpath) is the cumulative distance of a current sub-path, d(partent_subpath) represents the cumulative distance of the parent path corresponding to the current sub-path, and ds(Current_subpath) represents a path length of the current sub-path;

calculating the difference between the endpoint heading angle and the target heading angle of each sub-path in the collision-free candidate sub-paths, the difference $\Delta\theta$ between the endpoint heading angle and the target heading angle of the sub-path being calculated by the following formula: $\Delta\theta=\arccos[\cos(\theta_{end})\cdot\cos(\theta_{route})+\sin(\theta_{end})\cdot\sin(\theta_{route})]$, wherein $\theta_{end}$ is the endpoint heading angle of the sub-path, $\theta_{route}$ is the target heading angle; and calculating the heuristic distance of each sub-path in the collision-free candidate sub-paths, the heuristic distance h of the sub-path being calculated by the following formula: $h=d_{min}(S_{end},\text{route})$, wherein $S_{end}$ is an endpoint coordinate of the current sub-path, route is a target path given by a global path planning, and $d_{min}(S_{end},\text{route})$ is a shortest distance from the endpoint of the current sub-path to the target path.

4. The path planning method for autonomous driving according to claim 3, wherein the step of calculating a value of an evaluation function of each sub-path in the collision-free candidate sub-paths further comprises the following step:

according to the lateral acceleration, the curvature, the curvature change, the cumulative distance, the difference between the endpoint heading angle and the target heading angle of the sub-path, and the heuristic distance, which correspond to the sub-path, calculating the value of the evaluation function of each sub-path in the collision-free candidate sub-paths, the value of the evaluation function of the sub-path being calculated by the following formula: $f(s)=k_a \cdot a(s)+k_{\Delta k} \cdot \Delta k(s)+k_k \cdot k(s)+k_d \cdot d(s)+k_{\Delta\theta} \cdot \Delta\theta(s)+k_h \cdot h(s)$, wherein s is the current sub-path, f(s) is the value of the evaluation function of the current sub-path, a(s) is the lateral acceleration of the current sub-path, k(s) is the curvature of the current sub-path, $\Delta k(s)$ is the curvature change of the current sub-path, d(s) is the cumulative distance of the current sub-path, $\Delta\theta(s)$ is the difference between the endpoint heading angle and the target heading angle of the current sub-path, h(s) is the heuristic distance of the current sub-path, and $k_a$, $k_{\Delta k}$, $k_k$, $k_d$, $k_{\Delta\theta}$ and $k_h$ are weight coefficients of a(s), $\Delta k(s)$, k(s), d(s), $\Delta\theta(s)$ and h(s), respectively.

5. The path planning method for autonomous driving according to claim 3, wherein the step of calculating the difference between the endpoint heading angle and the target heading angle of each sub-path in the collision-free candidate sub-paths specifically comprises:

calculating the endpoint heading angle of each sub-path in the collision-free candidate sub-paths, the endpoint heading angle $\theta_{end}$ of the sub-path being calculated by the following formula:

$$\theta_{end} = \theta_0 + \frac{ds}{r},$$

wherein $\theta_0$ is a heading angle corresponding to a starting point of the sub-path, ds is a length of the sub-path, and r is a turning radius of the sub-path;

calculating the target heading angle of each sub-path in the collision-free candidate sub-paths; and according to the calculated endpoint heading angle and the target heading angle of the sub-path, calculating the difference $\Delta\theta$ between the endpoint heading angle and the target heading angle of each sub-path in the collision-free candidate sub-paths.

6. The path planning method for autonomous driving according to claim 5, wherein the step of calculating the target heading angle of each sub-path in the collision-free candidate sub-paths specifically comprises:

selecting an endpoint of each sub-path in the collision-free candidate sub-paths as a current point;

calculating a shortest distance from the current point to end points of a 8-segment cubic spline segment of the target path, and recording the shortest distance from the current point to the end points of the 8-segment cubic spline segment of the target path as a first shortest distance;

selecting front and rear cubic spline segments corresponding to an end point corresponding to the first shortest distance, and recording the selected front and rear cubic spline segments as a first cubic spline segment and a second cubic spline segment, respectively;

calculating shortest distances from the current point to the first cubic spline segment and the second cubic spline segment respectively by a bisection method;

selecting a relatively smaller value from the shortest distances from the current point to the first cubic spline segment and the second cubic spline segment, as a shortest distance from the current point to the target path; and selecting a heading angle of a point on the target path corresponding to the shortest distance from the current point to the target path, as the target heading angle $\theta_{route}$ of the sub-path.

7. The path planning method for autonomous driving according to claim 6, wherein the step of calculating shortest distances from the current point to the first cubic spline segment and the second cubic spline segment specifically comprises:

Step 1: dividing a given cubic spline segment into n segments according to a given time interval t, to obtain n+1 first type nodes, wherein the given cubic spline segment is the first cubic spline segment or the second cubic spline segment;

Step 2: calculating a shortest distance from the current point to n+1 first type nodes and a node Ptemp0 corresponding to the shortest distance;

Step 3: dividing two adjacent segments at the node Ptemp0 corresponding to the shortest distance in n segments into n segments according to the parameter t, to obtain n+1 second type nodes;

Step 4: calculating a shortest distance dtemp from the current point to n+1 second type nodes and a node Ptemp corresponding to the shortest distance dtemp; and Step 5: determining whether the shortest distance dtemp is less than a set minimum distance threshold, and if it is, taking dtemp as a shortest distance from the current point to the given cubic spline segment for output; otherwise, letting Ptemp0=Ptemp and returning to Step 3.

8. A path planning device for autonomous driving, wherein, comprising:

a memory;

a processor; and a program;

wherein the program is stored in the memory and executed by the processor to perform operations of:

obtaining environment perception information and vehicle positioning and navigation information, wherein the environment perception information comprises obstacle information, roadside information and lane line information, and the vehicle positioning and navigation information comprises vehicle pose and target route;

generating sub-paths according to the environment perception information and the vehicle positioning and navigation information, to obtain candidate sub-paths that meet vehicle constraints;

performing a collision detection on the candidate sub-paths that meet the vehicle constraints, to obtain collision-free candidate sub-paths;

performing a sub-path search on the collision-free candidate sub-paths by using an A* search algorithm; and obtaining a local path of a vehicle according to a result of the sub-path search;

wherein the program is executed by the processor to perform operations of:

calculating a value of an evaluation function of each sub-path in the collision-free candidate sub-paths, wherein an evaluation factor of the evaluation function of the sub-path comprises any one of a lateral acceleration, a curvature, a curvature change, a cumulative distance, a difference between an endpoint heading angle and a target heading angle of the sub-path, and a heuristic distance, which correspond to the sub-path, or any combination thereof;

according to the calculated values of the evaluation function and using the A* search algorithm, finding information on a sub-path with an optimal value of the evaluation function and a corresponding parent path from the collision-free candidate sub-paths; and outputting the information on the sub-path with the optimal value of the evaluation function and the corresponding parent path as a result of the sub-path search.

9. The path planning device for autonomous driving according to claim 8, wherein the program is executed by the processor to perform operations of:

according to the environment perception information and the vehicle positioning and navigation information, obtaining a set of sub-paths corresponding to a set of discrete curvatures k by using a control variate method, wherein k=1/r, and the curvatures k meet the following constraint: $-k_{max} \leq k_i \leq k_{max}$, r is a turning radius corresponding to a path, $k_i$ is the ith curvature in the set of discrete curvatures, and $k_{max}$ is a given maximum curvature.

10. The path planning device for autonomous driving according to claim 8, wherein the program is executed by the processor to perform operations of:

calculating the lateral acceleration of each sub-path in the collision-free candidate sub-paths, the lateral acceleration a of the sub-path being calculated by the following formula:

$$a = \frac{v^2 \cdot \delta}{[(1 + K \cdot v^2) \cdot (l_f + l_r)]},$$

wherein v is vehicle velocity, $$\delta = \arctan[(l_f + l_r) \cdot k],$$

$$K = \frac{M}{(l_f + l_r)^2 \cdot \left(\frac{l_r}{k_f} - \frac{l_f}{k_r}\right)},$$

M is ego vehicle mass, k is the curvature, $k_f$ and $k_r$ are tire cornering stiffness of front and rear wheels of the ego vehicle respectively, and $l_f$ and $l_r$ are distances from front and rear axles of the ego vehicle to vehicle center of gravity respectively;

calculating the curvature of each sub-path in the collision-free candidate sub-paths;

calculating the curvature change of each sub-path in the collision-free candidate sub-paths;

calculating the cumulative distance of each sub-path in the collision-free candidate sub-paths, the cumulative distance of the sub-path being calculated by the following formula: d(Current_subpath)=d(partent_subpath)+ds(Current_subpath), wherein d(Current_subpath) is the cumulative distance of a current sub-path, d(partent_subpath) represents the cumulative distance of the parent path corresponding to the current sub-path, and ds(Current_subpath) represents a path length of the current sub-path;

calculating the difference between the endpoint heading angle and the target heading angle of each sub-path in the collision-free candidate sub-paths, the difference $\Delta\theta$ between the endpoint heading angle and the target heading angle of the sub-path being calculated by the following formula: $\Delta\theta=\arccos[\cos(\theta_{end})\cdot\cos(\theta_{route})+\sin(\theta_{end})\cdot\sin(\theta_{route})]$, wherein $\theta_{end}$ is the endpoint heading angle of the sub-path, $\theta_{route}$ is the target heading angle; and calculating the heuristic distance of each sub-path in the collision-free candidate sub-paths, the heuristic distance h of the sub-path being calculated by the following formula: $h=d_{min}(S_{end}, \text{route})$, wherein $S_{end}$ is an endpoint coordinate of the current sub-path, route is a target path given by a global path planning, and $d_{min}(S_{end}, \text{route})$ is a shortest distance from the endpoint of the current sub-path to the target path.

11. The path planning device for autonomous driving according to claim 10, wherein the program is executed by the processor to perform operations of:

according to the lateral acceleration, the curvature, the curvature change, the cumulative distance, the difference between the endpoint heading angle and the target heading angle of the sub-path, and the heuristic distance, which correspond to the sub-path, calculating the value of the evaluation function of each sub-path in the collision-free candidate sub-paths, the value of the evaluation function of the sub-path being calculated by the following formula: $f(s)=k_a\cdot a(s)+k_{\Delta k}\cdot\Delta k(s)+k_k\cdot k(s)+k_d\cdot d(s)+k_{\Delta\theta}\Delta\theta(s)+k_h\cdot h(s)$, wherein s is the current sub-path, f(s) is the value of the evaluation function of the current sub-path, a(s) is the lateral acceleration of the current sub-path, k(s) is the curvature of the current sub-path, $\Delta k(s)$ is the curvature change of the current sub-path, d(s) is the cumulative distance of the current sub-path, $\Delta\theta(s)$ is the difference between the endpoint heading angle and the target heading angle of the current sub-path, h(s) is the heuristic distance of the current sub-path, and $k_a$, $k_{\Delta k}$, $k_k$, $k_d$, $k_{\Delta\theta}$ and $k_h$ are weight coefficients of a(s), $\Delta k(s)$, k(s), d(s), $\Delta\theta(s)$ and h(s), respectively.

12. The path planning device for autonomous driving according to claim 10, wherein the program is executed by the processor to perform operations of:

calculating the endpoint heading angle of each sub-path in the collision-free candidate sub-paths, the endpoint heading angle $\theta_{end}$ of the sub-path being calculated by the following formula:

$$\theta_{end} = \theta_0 + \frac{ds}{r},$$

wherein $\theta_0$ is a heading angle corresponding to a starting point of the sub-path, ds is a length of the sub-path, and r is a turning radius of the sub-path;

calculating the target heading angle of each sub-path in the collision-free candidate sub-paths; and according to the calculated endpoint heading angle and the target heading angle of the sub-path, calculating the difference $\Delta\theta$ between the endpoint heading angle and the target heading angle of each sub-path in the collision-free candidate sub-paths.

13. The path planning device for autonomous driving according to claim 12, wherein the program is executed by the processor to perform operations of:

selecting an endpoint of each sub-path in the collision-free candidate sub-paths as a current point;

calculating a shortest distance from the current point to end points of a 8-segment cubic spline segment of the target path, and recording the shortest distance from the current point to the end points of the 8-segment cubic spline segment of the target path as a first shortest distance;

selecting front and rear cubic spline segments corresponding to an end point corresponding to the first shortest distance, and recording the selected front and rear cubic spline segments as a first cubic spline segment and a second cubic spline segment, respectively;

calculating shortest distances from the current point to the first cubic spline segment and the second cubic spline segment respectively by a bisection method;

selecting a relatively smaller value from the shortest distances from the current point to the first cubic spline segment and the second cubic spline segment, as a shortest distance from the current point to the target path; and selecting a heading angle of a point on the target path corresponding to the shortest distance from the current point to the target path, as the target heading angle $\theta_{route}$ of the sub-path.

14. The path planning device for autonomous driving according to claim 8, wherein the program is executed by the processor to perform operations of:

dividing a given cubic spline segment into n segments according to a given time interval t, to obtain n+1 first type nodes, wherein the given cubic spline segment is the first cubic spline segment or the second cubic spline segment;

calculating a shortest distance from the current point to n+1 first type nodes and a node Ptemp0 corresponding to the shortest distance;

dividing two adjacent segments at the node Ptemp0 corresponding to the shortest distance in n segments into n segments according to the parameter t, to obtain n+1 second type nodes;

calculating a shortest distance dtemp from the current point to n+1 second type nodes and a node Ptemp corresponding to the shortest distance dtemp; and determining whether the shortest distance dtemp is less than a set minimum distance threshold, and if it is, taking dtemp as a shortest distance from the current point to the given cubic spline segment for output; otherwise, letting Ptemp0=Ptemp and return to divide two adjacent segments at the node Ptemp0 corresponding to the shortest distance in n segments into n segments according to the parameter t, to obtain n+1 second type nodes.

* * * * *